Feb. 5, 1957

P. J. DEWYER 2,780,044

MACHINE FOR SERVING SHORT LENGTHS OF TAPE AND
WRAPPING SAME AROUND VARIOUS ARTICLES

Filed July 21, 1951

INVENTOR.
PETER J. DEWYER
BY
Cromwell, Greist & Warden

Feb. 5, 1957 P. J. DEWYER 2,780,044
MACHINE FOR SERVING SHORT LENGTHS OF TAPE AND
WRAPPING SAME AROUND VARIOUS ARTICLES
Filed July 21, 1951 6 Sheets-Sheet 6

INVENTOR.
PETER J. DEWYER
BY
Cromwell, Greist + Warden

United States Patent Office 2,780,044
Patented Feb. 5, 1957

2,780,044

MACHINE FOR SERVING SHORT LENGTHS OF TAPE AND WRAPPING SAME AROUND VARIOUS ARTICLES

Peter J. Dewyer, Libertyville, Ill.

Application July 21, 1951, Serial No. 237,995

8 Claims. (Cl. 53—198)

The present invention relates to a machine which operates cyclically to serve pieces of tape of predetermined length to a device which operates to wrap the individual pieces of tape around objects or articles inserted into the machine such as automobile tail pipes, tool handles, bunches of asparagus and broccoli, handfuls of pencils, etc.

The tape used in the machine may be of any commercial type including pressure sensitive adhesive tape, gummed (water sensitive) tape, and heat activated tape. For many purposes, pressure sensitive adhesive tape is especially useful and the machine handles this type of tape very nicely and effectively. The machine may be converted readily to handle different types of tape by making minor changes and adjustments.

One important object of the invention is a machine in which the operator inserts an object which is to receive and to be wrapped with a piece of tape and the machine operates to apply and wrap the tape to the object at the proper location and the operator's removal of the object from the machine causes it to serve another piece of tape in readiness for application to a succeeding article. Thus, the operator has merely to insert the object or article into the machine and then withdraw it, and the machine does all the rest necessary to neatly and firmly wrap a piece of tape around the object.

Another important object of the invention is a device for evenly and neatly applying a piece of tape to an object and for overlapping the ends in place which comprises a pair of flexible, flap members facing each other across the entry opening into the device and serving to lightly apply a piece of tape to an object as it is inserted through the entry opening with the tape beneath it, and a U- or V-shaped piece of flexible strap or fabric material beneath the opening with the upper ends of the strap connected to arm members which operate in sequence to first wrap one end of the piece of tape firmly against the object and then to wrap the other end firmly thereto without causing any wrinkling or creasing of the tape.

Another object of the invention is a device for automatically serving pieces of tape of predetermined length at a desired location which comprises a holder for a supply spool of the tape, means for guiding the free end of the tape through a pair of open shears or past an equivalent severing device, and a reciprocable set of jaws which at one end of their stroke clamp onto the free end of the tape and remain clamped thereon during a reverse tape-withdrawing stroke at the end of which the jaws are opened after the shears or other cutting device have first operated to sever the tape.

A further important object of the invention is a cyclically operable machine for applying and wrapping a piece of sticky tape around an object such as an automobile tail pipe, the insertion of the object to be taped into the machine carrying the piece of tape into a device for applying and wrapping it around the object, and the removal of the tail pipe serving to reset the machine so that it operates to withdraw another piece of tape and sever it at the proper length.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein.

Figure 1:
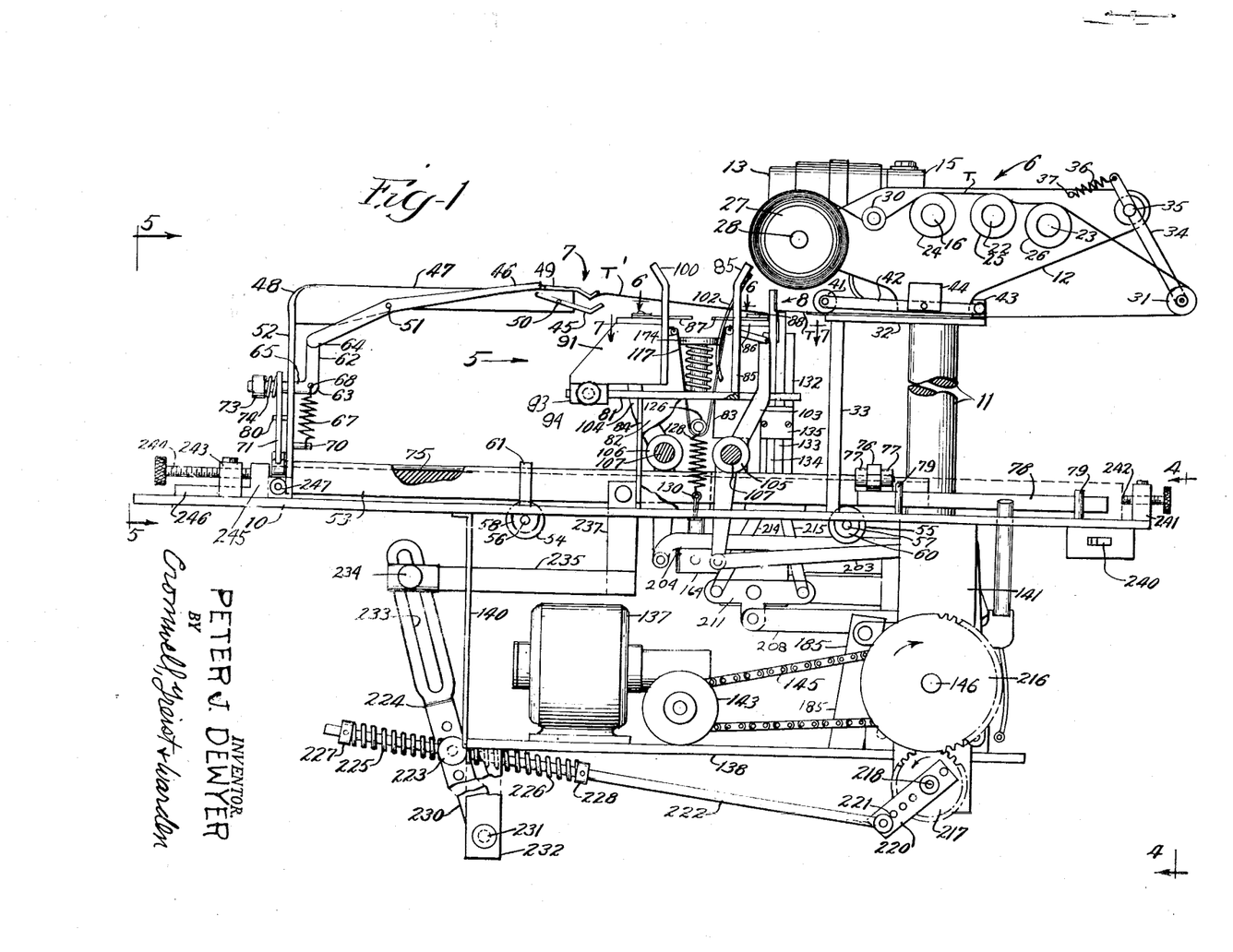
Fig. 1 is a side elevational view of a machine constituting one embodiment of the invention, certain parts being broken away.
Figure 2:
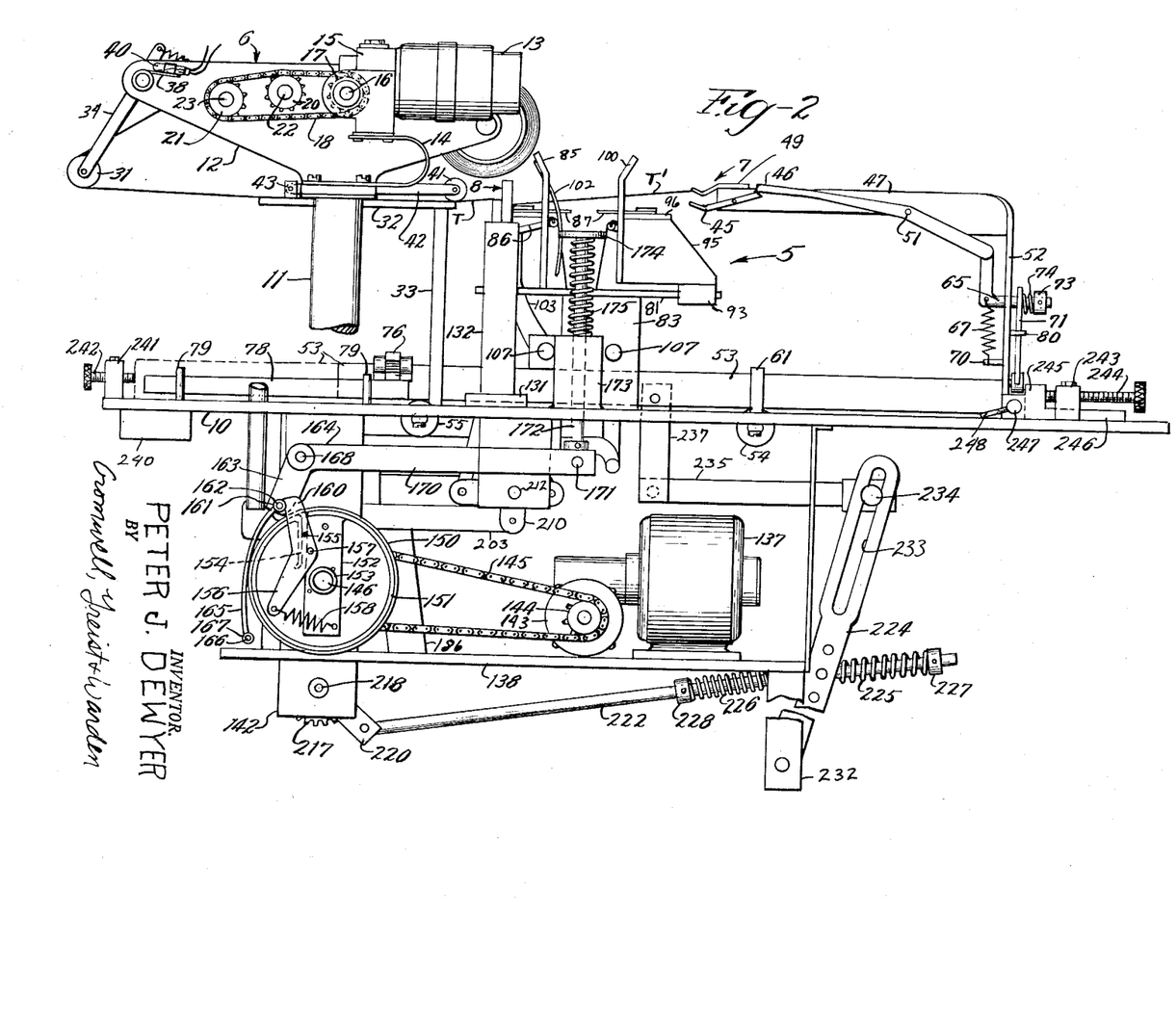
Fig. 2 is a side elevational view of the machine shown in Fig. 1 taken from the opposite side.

Referring to Figs. 1 and 2, the machine is in a general way composed of the following: A device indicated generally at 5 which serves to apply and wrap a piece of severed tape around an elongated object such as an automobile tail pipe; a mechanism indicated generally at 6 for paying out tape from a supply spool; a tape clamping jaw assembly 7 for gripping the free end of the tape and pulling it the proper distance over the wrapping device 5; a pair of shears indicated generally at 8 for severing the tape; together with the additional parts and mechanism for cyclically operating and driving the main operating elements and devices in proper sequence.

The main horizontal platform of the machine is indicated at 10. A portion of the machine is built above and supported on the platform 10 while the remaining portion thereof is suspended below it. The platform 10 may be set in a rectangular frame having suitable support legs. It will be understood that the portions of the machine which do not need to be open or accessible may be enclosed or housed in order to improve the looks of the machine and for safety purposes.

The mechanism 6 for withdrawing and feeding the tape to the wrapping device 5 is particularly designed for handling pressure sensitive adhesive tape. This same mechanism can also be used for handling other types of tape, such as gummed tape or heat activated tape. If gummed tape is utilized, a moistening device is added so as to moisten the tape after it is withdrawn from the supply roll and before it reaches the wrapping device 5. When heat activated tape is utilized, a heating device will be added to properly heat or warm the withdrawn tape so as to make it sticky before it reaches the wrapping device 5. The tape withdrawing mechanism 6 is supported from the platform 10 by means of a column 11 on the upper end of which a vertical mounting plate or bracket 12 is supported. An electric motor 13 is supported on one side of the plate 12 by means of a bracket member 14 (Fig. 2) carrying a gear reducer unit 15 to which the motor 13 is attached. The drive shaft 16 carries a drive sprocket 17 over which runs a chain 18 which serves to drive sprockets 20 and 21 carried on stub shafts 22 and 23, respectively, which project through on the opposite sides of the panel or plate 12 and are suitably journaled in bearings mounted thereon. On the side of the plate 12 opposite from the motor 13 the drive shaft 16 and the driven stub shafts 22 and 23 carry tape withdrawing rolls 24, 25 and 26, respectively. The surfaces of these rolls are mutilated in known manner so that the roll 24 presents the greatest amount of land surface, the intermediate roll 25 presents somewhat less land surface, and the third roll 26 presents only a very small amount of land surface. This arrangement is a known expedient for unwinding pressure sensitive adhesive tape from a supply roll without tearing it and without stretching it unduly. The supply roll 27 is slipped onto a holding spindle 28 and the tape T is trained underneath a free running guide roll 30 and then over the withdrawing rolls 24, 25 and 26 as shown in Fig. 1. After leaving the third roll 26 the tape T passes over a pendulum supported roll 31 and it is then fed over a tape support plate 32 supported from the platform 10 by means of a vertical plate 33. The roll 31 is carried on the bottom end of an arm 34 which is swingably mounted on a stub shaft 35 extending through the plate 12. A tension spring 36 is connected between the free upper end of the arm 34 and a pin 37 projecting from the plate 12 and serves to pull or urge the roll 31 in an outward or counterclockwise direction as viewed in Fig. 1. On the opposite side of the plate 12 the shaft 35 carries a mounting member 38 which carries a mercury switch 40. The switch 40 is connected in electrical circuit relationship with the driving motor 13 in such a way that when the switch is tilted so that contact is made through the pool of mercury therein, the motor 13 will be energized and will drive the rolls 24, 25 and 26 automatically to withdraw tape from the supply spool 27 until such time as the motor is de-energized. The switch 40 is so arranged that when the pendulum roller 31 is in its closest relationship to the supply roll 27 the switch 40 will be energized and the motor 13 will operate so as to cause tape to be withdrawn and payed out. When the roller 31 occupies a position remote from the tape roll 27, then the contact through the switch 40 will be broken and the motor 13 will be de-energized. In this manner, the mechanism 6 operates intermittently to pay out the tape and maintain a supply of tape of adequate length extending beyond the roller 31.

The tape T is maintained in a flat condition on top of the plate or platform 32 by means of a weighted roller 41 mounted on the outer end of a horizontal arm 42 pivotally mounted at its opposite end by means of a pin extending through the arm 42 and a projection 43 on the plate 32. A shiftable weight member 44 (Fig. 1) is mounted on the arm 42 so as to control the amount of pressure on the roller 41. It will be seen that the roller 41 rides over one edge of the platform 32 and that the free end of the tape T projects beyond the roller up to the shears 8 so that it may be gripped by the clamping jaws 7.

Additional lengths of tape are repeatedly withdrawn over the wrapping device 5 by means of the clamping jaws 7 which are mounted for reciprocable movement and so operated. The tape clamping and withdrawing jaws 7 comprise a fixed upper jaw 49 mounted on an arm 47 and a lower jaw member 45 which is free to rotate or turn, and which is operated by means of a lever 46. The jaw member 45 is pivotally supported on the horizontal arm 47 of an L-shaped bracket member 48 by means of a pin 50. The lever member 46 is bifurcated so as to fit on opposite sides of the bracket arm 47 and is also pivotally mounted on the arm 47 by means of a pin 51. The bracket 48 has a vertical leg 52 which is secured to one end of a longitudinal bar 53 which is supported for reciprocable or longitudinal shifting movement over the top of the platform 10. The bar 53 is supported slightly off from the surface of the platform 10 by means of a pair of support rollers 54 and 55. The support rollers 54 and 55 are mounted on shafts 56 and 57, respectively, extending between depending pairs of ears 58—58 and 60—60. The bar 53 is guided on one end by means of an inverted U-shaped member 61 located over the roller 54 and on the opposite end it passes through a guide-way opening provided therefor in the vertical plate 33.

The rear end of the jaw operating lever 46 is rigidly connected to the vertical leg 62 of a bell crank member 63 at 64. The horizontal leg 65 of the bell crank member 63 is cylindrical and it projects rearwardly through a vertical slot opening 66 (Fig. 5) in the vertical bracket leg member 52. A tension spring 67 has one end thereof hooked through an eye opening 68 in the member 63 while the other end is hooked over a projection 70 carried on the vertical member 52 so as to thereby tension the bell crank member 63 in its downward position and also tension the jaw member 46 in a counterclockwise direction as viewed in Fig. 1.

The horizontal leg 65 passes through a sloppy fitting hole in the upper end of the longer link 71 (Fig. 5) of a toggle linkage comprising the link 71 and a shorter link 72. A stop 73 is mounted on the free end of the leg 65 and a spring 74 is compressed between the stop 73 and the adjacent side of the link 71 as shown in Figs. 1 and 2 and serves to prevent the link 71 from working down the leg 65. The spring 67 serves to lift the lever 46 in a positive manner.

Figure 10:
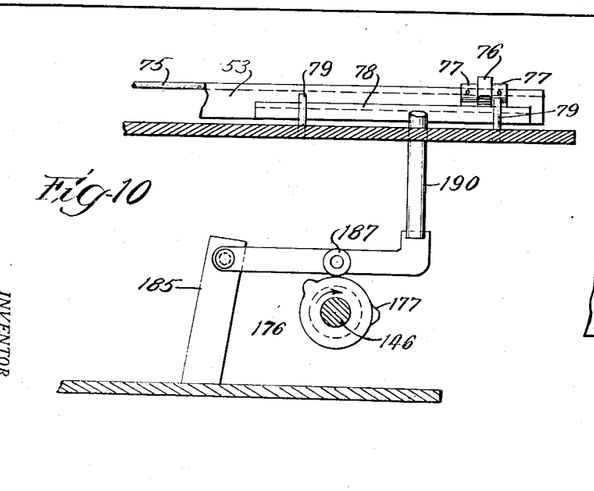
Fig. 10 is a fragmentary elevational view taken on line 10—10 of Fig. 4.
Figures 15, 16:
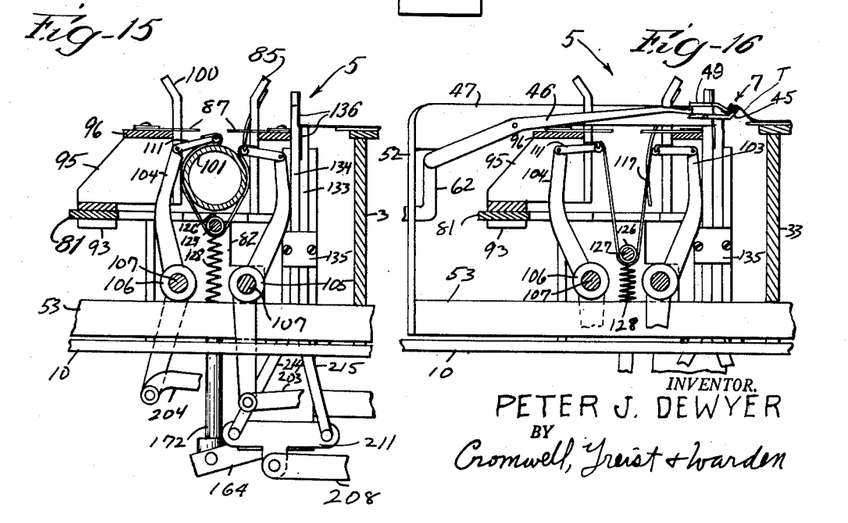

The shorter link 72 of the toggle linkage is rigidly fastened onto the adjacent end of a rocker rod member 75 which extends through and rests in a groove provided therefore in the top edge of the reciprocable bar 53. Adjacent its opposite end the rod 75 is provided with a rocker member 76 (Figs. 4 and 10) which is permanently keyed to the rocker rod 75. The position of the rocker arm 76 on the rod 75 is secured by a pair of block members 77—77. The rocker arm 76 is adapted to be rocked or tilted first to one side and then to another by means of a set or pair of horizontal angle members 78—78 (Figs. 1 and 4) lying on opposite sides of the bar 53. Each of the angle members 78 is kept from turning by means of a pair of pins 79—79 projecting from the platform 10. These elongated members 78 are alternately raised and lowered during the operation of the machine so that the rod 75 and the link 72 are alternately rocked first to one side and then to the other. When the toggle linkage is in the condition shown in Fig. 5, the horizontal leg 65 rests in its lower position and the rear end of the lever 46 is positively held in the down position as shown in Figs. 1 and 2 by means of the spring 67. When the short toggle link 72 is rotated counterclockwise (i. e. turned to the left) from the position shown in Fig. 5, the horizontal leg 65 of the bell crank 63 is elevated and the lever 46 is rotated in a clockwise direction so as to depress the inner end thereof against the rear end of the movable jaw 45 and thereby close it against the clamping end of the stationary member 49 as shown in Fig. 16.

A stop pin 80 is provided on the vertical leg 52 of the bracket member 48 in such a position as to stop or arrest the overcenter movement of the toggle linkage when the link 72 and the shaft or rod 75 are rotated so as to produce closure of the jaws 7. If it were not for this blocking pin 80, the jaws might not remain closed but might first close and then open up on continued turning of the toggle.

Figure 6:
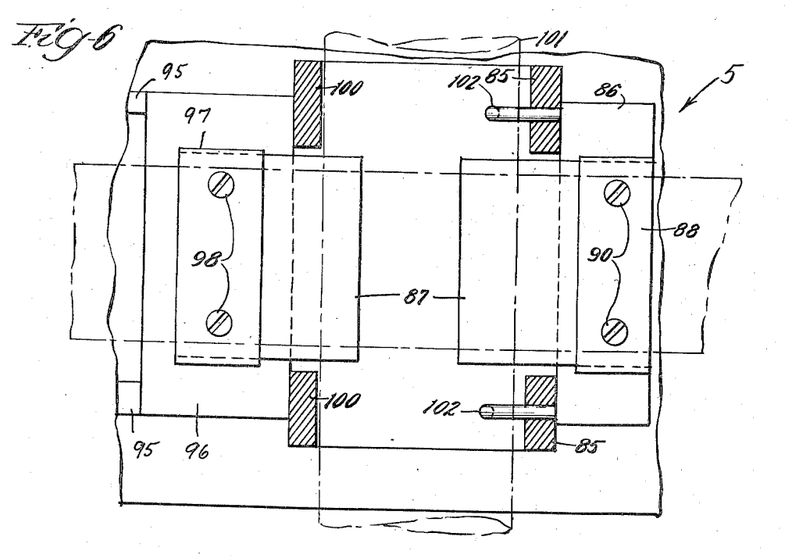
Fig. 6 is a fragmentary plan view on enlarged scale taken on line 6—6 of Fig. 1.

The tape applying and wrapping device 5 constitutes a very important part of the machine and it may be used alone or with other machines where a device is required for applying a length of tape to an object and wrapping or folding the same therearound. The device 5 includes a supporting structure comprising a horizontal plate or platform 81 supported above the main platform 10 by slide plates 82 and 83 and one end wall 84. A pair of permanently positioned article guide members 85—85 are supported on and above the platform 81 (Figs. 1 and 6). The vertical guide members 85 serve as supports for a horizontal bracket 86 projecting toward the shears 8. The bracket 86 serves as a support platform for one of a pair of flexible flap members 87—87. These flaps may be formed of rubber, metal or other material of suitable flexibility. One of these flap members 87 is secured on the plate 86 by means of a clamping strip 88 (Fig. 6) held in place on the bracket 86 by means of two screws 90—90.

Figure 5:
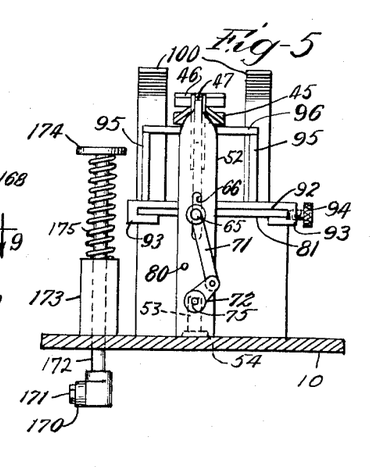
Fig. 5 is a partial end elevational view taken from the left-hand end of the machine as indicated in Fig. 1.

The other flap 87 is carried on an adjustable fixture 91 which is slidable on one end of the platform 81. The fixture 91 includes a bottom member 92 (Fig. 5) having inwardly turned U-shaped ends 93—93 which allow it to slidably fit over the plate 81. A thumb screw 94 is provided in one of the ends 93 as shown in Fig. 5 so that the fixture 91 may be clamped in any desired position on the plate 81. Two vertical side plates 95—95 are supported on the top of the slide member 92 and a horizontal support plate 96 is mounted across the upper ends of the plates 95 and serves as a support for the second or adjustable flexible flap 87. This flap 87 is secured on the plate 96 by means of a clamping strip 97 held in place by two screws 98—98. A pair of vertical article guide members 100—100 are secured to the front edges of the vertical side plates 95 as shown in spaced side-by-side relationship so as to correspond to the spaced relation between the fixed vertical guide members 85—85.

The upper ends of each pair of the article guide members 85 and 100 are outwardly turned as shown so as to facilitate the insertion of an object to be taped such as an automobile tail pipe which is indicated in Figs. 13–16 at 101. In order further to facilitate the insertion of the article to be taped, the stationary guide members 85 are each provided with spring fingers 102—102. The upper end of each of these spring fingers 102 projects through a hole provided therefor in the guide member 85 and is welded to the rear side of the backwardly turned top portion as shown in Figs. 1 and 2. The remainder of each spring clip or finger 102 projects downwardly in front of the respective guide member 85.

Figures 7, 8:
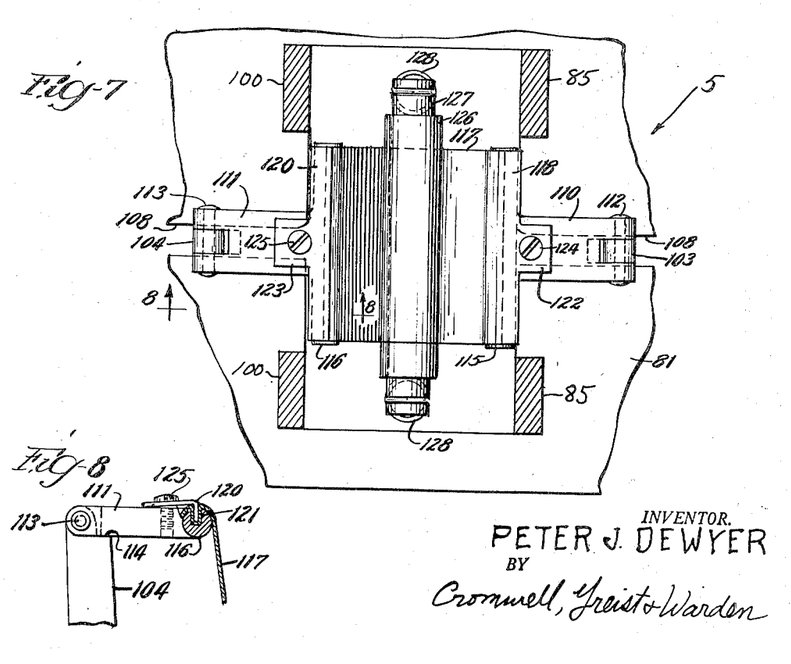
Fig. 7 is a correspondingly enlarged detail plan view taken on line 7—7 of Fig. 2.
Fig. 8 is a fragmentary sectional view taken on line 8—8 of Fig. 7.
Figures 13, 14:
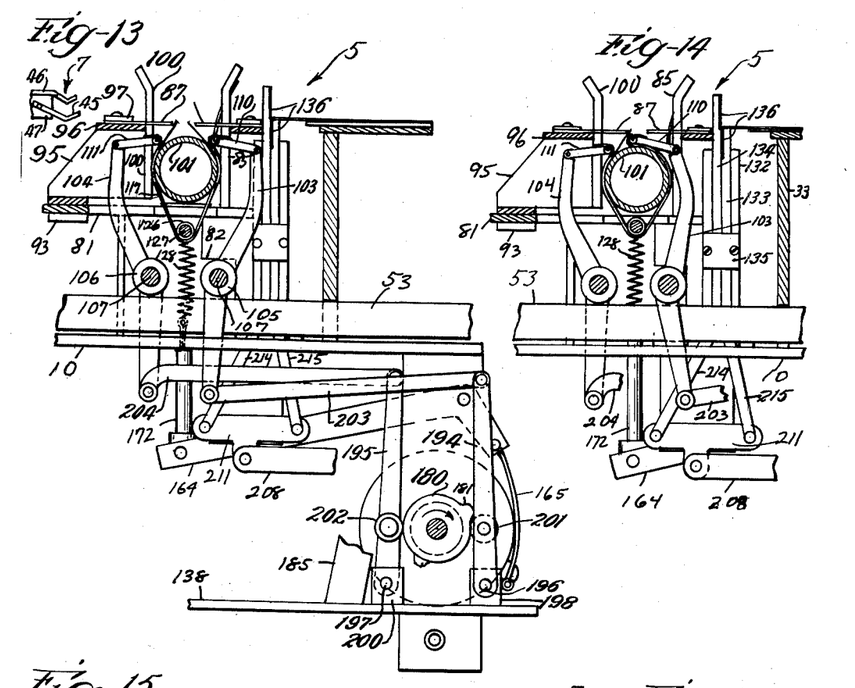
Fig. 13 is a fragmentary sectional view on enlarged scale showing the position of certain elements and parts of the machine at the beginning of the operating cycle when an object to be taped is inserted.
Figs. 14, 15 and 16 are corresponding vertical sectional views showing succeeding operations of the machine as it carries out the operating cycle.

The wrapping and folding device 5 also includes a pair of folding or wrapping arms 103 and 104. Each of these arms 103 and 104 is provided intermediate its ends with a transverse sleeve member 105 and 106, respectively. These sleeves 105 and 106 fit over transverse supporting rods 107—107 which extend between the opposed vertical side plates 82 and 83. The arms 103 and 104 extend upwardly through slot openings 108—108 (Fig. 7) provided therefor in the plate 81 in between the pairs of article guide members 85 and 100. Each of the folding arms 103 and 104 is provided on its upper end with a link member 110 and 111, respectively, as shown in Figs. 7 and 13. The link 111 is shown in side elevation in Fig. 8. Each of the links 110 and 111 is bifurcated at its rear end so as to fit over the upper end of the respective folding arm 103 or 104. Pins 112 and 113, respectively, secure the links 110 and 111 in place. Downward turning of the link 111 on the arm 104 is limited by means of a shoulder 114 (Fig. 8) thereon which serves as a stop or abutment against which the link 111 comes to rest. The folding arm 103 is provided with a corresponding shoulder for arresting the downward rotation of link 110.

Each of the links 110 and 111 carries on its outer end a transverse rod 115 and 116, respectively. Each of these rods has a longitudinal slot or groove formed in the top edge thereof into which is locked the upper end of a V-shaped flexible strap member 117 as shown in Fig. 8. In order to lock the ends of the strap member in place, each of the links 110 and 111 is provided with a clamping member 118 and 120, respectively, formed of thin material and having an elongated, vertical portion which fits down into the slot in the respective rod members 115 or 116 as indicated at 121 in Fig. 8. Each of the clamping members 118 and 120 has a rearwardly projecting center portion 122 and 123, respectively, by means of which these may be screwed and secured onto the links 110 and 111 by screws 124 and 125, respectively. It will be noted from Fig. 8 that one of the ends of the flexible strap member 117 is locked in the slot of the rod member 116 by passing the strap end underneath the longitudinal portion 121 of the clamping member 120, thereby insuring that the end cannot be dislodged or withdrawn.

The apex or bottom end of the V-shaped strap member 117 is held taut by means of a sleeve member 126 (Figs. 1 and 7) rotatably supported on a rod 127. Tension springs 128—128 are fastened onto the projecting ends of the rod 127 and the lower end of each spring is hooked in the eye of a cotter pin 130 (Fig. 1) projecting upwardly from the main platform 10. The downward tension on the V-member 117 pulls down each of the folding arm links 110 and 111. The V-shaped strap member 117 may be formed of a flexible material such as strong canvas, leather, webbing or a similar material.

Figure 3:
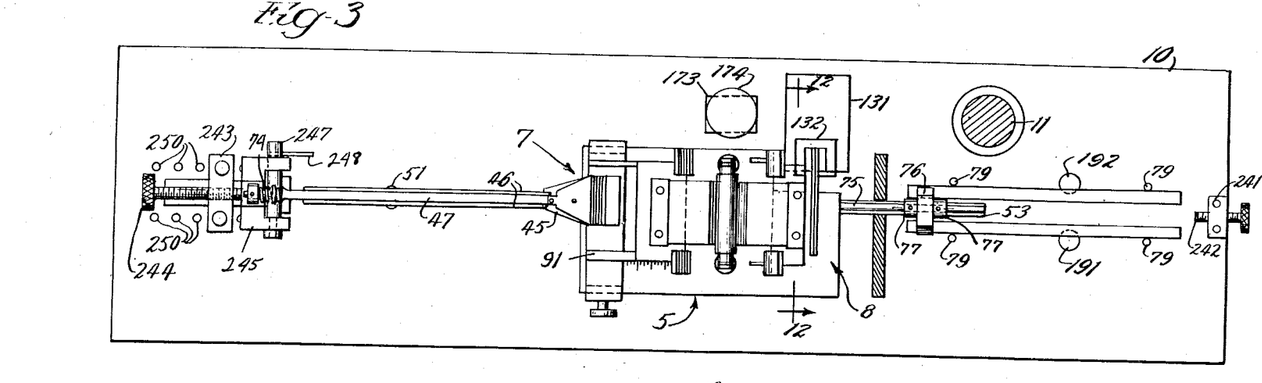
Fig. 3 is a top plan view of the machine shown in Figs. 1 and 2 with the mechanism for withdrawing the tape from the supply roll removed.
Figure 12:
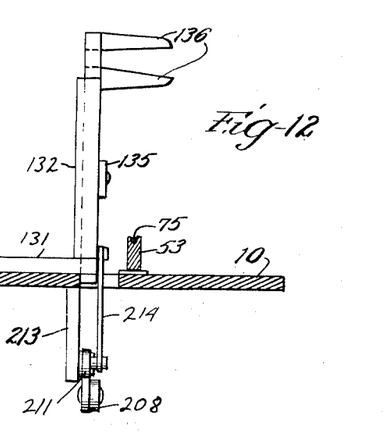
Fig. 12 is a fragmentary elevational view of another detail of the machine showing the tape severing shears and taken generally on line 12—12 of Fig. 3.

The tape cutting shears indicated generally at 8 are supported on the platform 10 by means of a plate member 131 (Fig. 3) carrying a vertical channel post 132. The channel opening in the member 132 serves as a guideway for a pair of vertically reciprocable shear carrying arms 133 and 134. The arms or members 133 and 134 are retained in the channel by means of a retaining plate 135 (Fig. 1). Each of the slide members 133 and 134 carries a shear or blade 136 on the upper end thereof as shown, for example, in Fig. 12. These shears 136—136 are suitably set into the upper ends of the members 133 and 134 so as to permit the shears to slide past each other in closing and opening.

The mechanism and driving means for operating the reciprocating jaws 7; the wrapping device 5; and the shears 8 will now be described:

The driving power for the various operating parts of the machine other than the tape unwinding mechanism 6 is supplied by an electric motor 137 mounted on a horizontal plate 138 supported underneath the main plate 10. The plate 138 is suspended from the platform 10 by means of a transverse bracket member 140 on one end and by means of a pair of vertical side members 141 and 142 spaced on opposite sides of the other end of the plate 138. The motor 137 is provided with a gear reducer unit 143 having a power takeoff sprocket wheel 144. A chain 145 runs over the sprocket 144 and a sprocket wheel 147 and transmits power to a main drive shaft 146 through a clutch mounted thereon. The drive shaft 146 is carried in journals mounted on the side supports 141 and 142 and the shaft projects beyond the opposite sides of these support members as shown, for example, in Fig. 4. The sprocket wheel 147 is mounted on a sleeve member 148 which fits over the drive shaft 146 and projects from the rear side of the outer drum 150 of a clutch of the type which has a continuously running outer drum and an interfitting inner drum 151 which is intermittently driven upon being expanded into frictional engagement with the running outer drum 150. Accordingly, the sprocket wheel 147 and the outer clutch drum 150 on which it is carried are continuously driven when the motor 137 is in operation, but the drive shaft 146 turns only when the clutch is engaged. The friction rim of the inner drum 151 (Fig. 2) is split so as to be expandable and contractible within the rim of the outer rotating drum 150. The inner drum 151 is keyed or otherwise fixed to the drive shaft 146 and has a spoke member 152 having a hub 153 fitting over the shaft 146. The spoke 152 is mounted at only one end. The free or expandable end of the rim 151 has an inwardly turned portion 154 which is engaged by a pin 155 projecting from the back side of a bell crank lever 156 which is pivotally mounted on the spoke 152 by means of a pin 157. The inner end of the bell crank 156 is connected to one end of a tension spring 158, the other end of which is connected to the free end of the spoke 152. As viewed in Fig. 2, the spring 158 tends to rotate the bell crank lever 156 in a counterclockwise direction so as to cause the pin 155 carried thereby to press against the projection 154 and thereby expand the inner clutch rim 151 into frictional engagement with the outer continuously running drum 150.

The outer end of the bell crank lever 156 which is indicated at 160 projects beyond the periphery of the clutch and is adapted periodically to engage a projecting sleeve member 161 carried on a pin 162 projecting from the end of the shorter and bifurcated arm 163 of a bell crank lever 164. A strap member 165 is attached to the sleeve member 161 and hangs downwardly over one side of the clutch and is provided on its free end with a pin 166 which carries a sleeve roller 167. The outer end 160 of the bell crank lever 156 alternately engages the sleeves 161 and then 166. The bell crank lever 164 serves to release the projecting end 160 first from one of the sleeves 161 or 166 and then from the other one.

The bell crank lever 164 is pivotally mounted on a pin 168 carried on the outside of the vertical side member 142 and the longer arm 170 of the bell crank lever 164 extends horizontally back underneath the platform 10 as far as the wrapping and folding device 5, as shown in Fig. 2. A pin 171 serves to pivotally connect the free projecting end of the longer arm 170 to the bottom end of a plunger rod 172. The rod 172 extends up through the platform 10 and up through a guide sleeve or post 173 mounted thereon. A flat disk member 174 is carried on the upper end of the rod 172 and is positioned opposite and to one side of the V-shaped flexible strap member 117 as shown in Fig. 5. A compression spring 175 is retained beneath the disk member 174 and the top of the column or post 173 so as normally to hold the disk member 173 in its uppermost position and to return it thereto when pressure is removed therefrom. When an object or article to be taped or labeled is inserted in the taping device 5 and it is pushed down so as to depress the disk member 174 and the rod 172, the bell crank lever 164 (as viewed in Fig. 2) is rotated clockwise and the sleeve member 161 is disengaged from the projecting hook end 160. As soon as the end 160 is free the spring 158 causes the inner band 151 to expand into frictional engagement with the outer running band 150 and the inner clutch member and the shaft 146 are then rotated or driven until the hook end 160 of the bell crank lever 156 engages the projecting sleeve 166, whereupon the movement is arrested and the inner spring member 151 disengages itself by contracting. Whenever the pressure is removed from the disk member 174, the spring 175 raises it and causes the sleeve projection 166 to be disengaged from the projecting end 160 and thereby allows the inner clutch member 151 to expand and continue its rotation until the end 160 comes around and then again engages the projecting sleeve 161.

Figure 4:
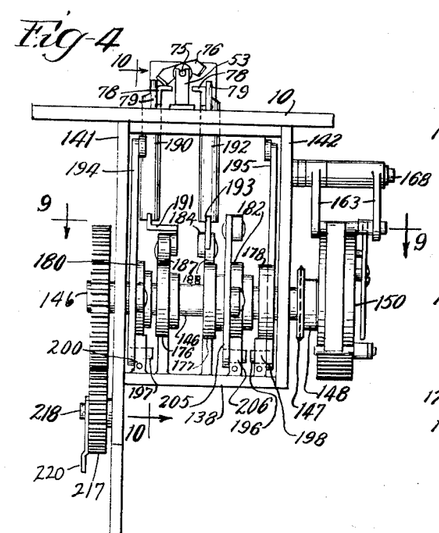
Fig. 4 is an end elevational view of the machine taken generally on line 4—4 of Fig. 1.
Figure 9:
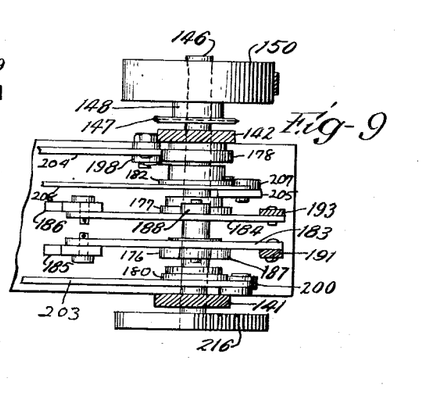
Fig. 9 is a fragmentary detail plan view taken on line 9—9 of Fig. 4.

The drive shaft 146 carries five cams as shown in Figs. 4 and 9. Four of these cams may be identical and these are indicated at 176, 177, 178 and 180. A side elevation of one of these cams (i. e. cam 180) is shown in Fig. 13, and is shown to have a single rise 181, being otherwise circumferential. The inner pair of cams 176 and 177 serve to operate the rocker rod 75 and thereby the jaws 7 as will be presently described. The outer set of the cams 178 and 180 serve to operate the tape folding arms 103 and 104 as will also be described presently. A fifth cam 182 of different contour is mounted on the drive shaft 146 and it functions to operate the shears 8.

The action of the cams 176 and 177 is transferred to the rocker shaft 75 through a system of links and levers comprising a pair of levers 183 and 184 (Fig. 9). The inner end of each of these levers is pivoted to fixed support members 185 and 186, respectively, extending upwardly from the platform 138 as shown in Figs. 1 and 9. The lever 183 carries a cam following roller 187, while the lever 184 carries a following roller 188. The outer end of the lever 183 is pivotally connected to the bottom end of a vertical post 190 by means of the end bracket 191, while the outer end of the lever 184 is connected to the bottom end of a second post 192 by means of a link 193 as shown in Figs. 4 and 9. The posts 190 and 192 are vertically reciprocal through openings provided therefor in the platform 10 and on their upper ends carry the two elongated angle members 78—78. The cams 176 and 177 are so positioned relatively on the drive shaft 146 that the respective rises 181 thereon elevate first one of the posts 190 or 192 and then the other. This reciprocating action causes the elongated members 78 alternately to engage opposite ends of the rocker member 76, thereby rocking the shaft 75 first in one direction and then in the other so as alternately to open and close the tape gripping jaws or clamping members 7.

The tape folding or wrapping arms 103 and 104 are operated from the cams 178 and 180 through the system of links and levers which will now be described. A generally vertical or upright lever 195 (Figs. 4 and 13) is provided for the cam 178 and another similar lever 194 is provided for the cam 180. Each of these levers 194 and 195 is pivoted at the bottom by means of pins 196 and 197, respectively, to upstanding ears or lug members 198 and 200 carried on the top of the plate 138. The lever 194 is provided with a cam roller 201 (Fig. 13) for engaging the cam 178 while the lever 195 is provided with a corresponding cam roller 202 for engaging and following the cam 180. The bottom end of the folding arm 103 is interconnected with the top end of the lever 194 by means of a link 203 (Fig. 13). In like manner, the bottom end of the folding arm 104 is interconnected with the upper end of the lever 195 by means of a link 204. The links 203 and 204 are pivotally connected with the respective arms and levers at their opposite ends, as indicated. The operating cams 178 and 180 are so positioned relatively on the drive shaft 146 that when the machine is in operation the folding arm 103 is first to operate and as it is withdrawn or turned out the other folding arm 104 folds in, as will be further described hereinafter.

Figure 11:
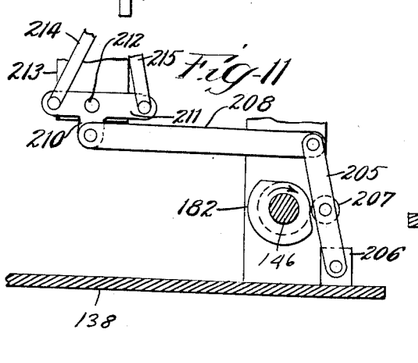
Fig. 11 is a fragmentary elevational view of a detail of the machine.

The shears 8 are operated from the single cam 182 through a linkage and lever system which includes a lever 205 (Fig. 11) pivotally connected at its bottom end to an upstanding lug or boss 206 and carrying on one side thereof a cam follower roller 207 which engages and follows the cam 182. The upper end of the lever 205 is pivotally connected to one end of a link 208, the opposite end of which is pivotally connected to a downwardly projecting ear 210 on a rocker link 211. The link 211 is pivotally carried on a pin 212 intermediate its ends on the bottom end of a supporting plate 213 (Figs. 11 and 12) carried on the underside of the main platform 10. A link 214 is pivotally connected at its bottom end to one end of the rocker link 211 and its upper end the link 214 is pivotally connected to the bottom end of the shear slide member 134. A second link 215 is pivotally connected at its lower end to the opposite end of the rocker link 211 and is pivotally connected at its upper end to the bottom end of the other shear slide member 133. It will be seen that when the link 211 is rocked counterclockwise (as viewed in Fig. 1) the shear blades 136 are separated whereas when the link 211 is tilted in the opposite direction the shears are closed. The cam 182 is so shaped and positioned on the drive shaft 146 that properly timed operation of the shears 8 is obtained.

The mechanism for shifting or reciprocating the transverse bar 53 which carries the clamping jaw assembly 7 is driven from the drive shaft 146 by means of a mutilated gear wheel 216 mounted on the projecting end of the shaft 146 opposite the clutch. As shown in Fig. 1, the gear wheel 216 is mutilated for approximately one-half of its circumference. The gear wheel 216 meshes with a pinion gear 217 mounted on a stub shaft 218 carried on the bottom end of the side member 141. A crank arm 220 is carried on the pinion gear 217 and it is provided with a plurality of longitudinally spaced holes 221 whereby one end of a connecting rod 222 may be pivotally connected to the crank 220 at the desired location therealong so as to give the required throw. The connecting rod 222 projects through a hole provided therefor in a cylindrical block 223 which is pivotally mounted on the side of a link member 224. The connecting rod 222 is slidable through the pivoted block 223 and in order to transfer shifting movement of the rod 222 to the link 224 without a rigid connection compression springs 225 and 226 are located around the rod 222 at opposite sides of the block 223. The spring 225 is secured in place by means of an adjustable block member 227 while the spring 226 is secured in place by means of an adjustable block 228. This type of connection affords a yieldable or non-rigid connection between the rod 222 and the link 224, the purpose of which will be mentioned presently.

The offset lower end 230 of the link 224 is pivotally connected by means of a pin 231 to a depending support member 232 carried underneath the plate 138. The upper free end of the lever 224 is provided with an elongated slot 233. A pin 234 connects one end of a link 235 to the lever 224 and is slidable in the slot 233. The link 235 is rigidly connected at its opposite end to the bottom end of an arm member 237 which is rigidly connected to the sliding bar 53 at approximately the midpoint thereof.

In order to control accurately the length of tape withdrawn by the clamping jaws 7 blocking or stop means are located on the platform 10 so as to be engaged by the opposite ends of the bar 53 and thereby define and limit its movement. The means for limiting the forward movement of the jaws 7 consists of a block 241 fixed on the platform 10 in line with the bar 53 and carrying a screw 242. Once the screw 242 is set it seldom needs to be readjusted since the jaws 7 are normally required to clamp onto the free end of the tape T at the same place.

The rearward or withdrawing movement of the jaws 7 is controlled by stop means comprising a fixed block 243 mounted on the platform 10 and carrying a screw 244 aligned with the bar 53. A sliding block member 245 rests on the platform 10 and has an extension 246 which fits through a guide opening in the block 243. The screw 244 serves to position the block 245 which carries in front a cylinder 247 which has one flat side. The cylinder 247 is provided with a pin 248 by which it may be turned so that the flat side is forward or not, as desired. The cylinder 248 provides a convenient means for correcting minor changes in the lengths of tape withdrawn by the jaws 7. This is particularly useful where the tape is printed with a label or design which is not repeated on the lengths withdrawn. In such a case it is important to have the pieces withdrawn carry a whole label.

For large adjustments in the lengths of pieces of tape that are withdrawn the platform 10 is provided with a series of holes 250—250 (Fig. 3) over which the block 243 may be moved.

*Mode of operation*

A supply spool 27 of pressure sensitive adhesive tape which is printed with the desired labels or indicia is mounted on the spindle 28 and the end of the tape T is withdrawn so as to thread it under the guide roller 30, over the withdrawing rolls 24, 25 and 26, around the swinging roller 31 and the end is brought over the platform 32 under the weighted roller 41 and enough of the end is allowed to project beyond the edge of the platform 32 and the roller 41 so that it will be gripped by the clamping jaws 7. The machine is now in readiness for operation and the main switch 240 is turned on which energizes the motor 137 and starts it running and at the same time through the mercury switch 40 energizes the circuit for the motor 13 for feeding the tape as required.

The plate 174 and the plunger rod 172 on which it is carried are depressed either by hand or by an article and then released in order to put the machine through one operating cycle so that the clamping jaws 7 will move up and grasp the end of the tape T and withdraw it the proper distance, whereupon the knives 8 operate to sever the withdrawn length of tape. The operator may now begin using the machine to apply lengths of the tape to articles such as automobile tail pipes and to wrap the labels or tape therearound. With a piece of tape T', its sticky side up, overlying the entry opening into the wrapping device 5 as shown in Figs. 1 and 2, the operator places the object or article to be taped over the top of the tape T' and, holding in a generally horizontal position, with an end of the object engaging the plate 174, the operator lowers it down into the wrapping device 5. As the object engages the sticky side of the tape and is lowered into the machine, the ends of the tape T' are pulled in, one end being pulled off the clamping end of the fixed upper jaw 49 to which it adheres when the jaws 7 open up. The flexible flaps 87 bend around the article as it is lowered therebetween and these flaps serve to wipe the length of tape T' around the bottom of the object or article and then these flaps 87 spring up or straighten out again after the tail pipe 101 has passed thereunder. The relationship of the parts and the manner in which the flexible flaps 87 lightly wipe or apply the length of tape onto the tail pipe as it is lowered into the wrapping device 5 is shown and illustrated in Fig. 13.

Depression of the plunger platform 174 simultaneously with the lowering of the tail pipe 101 into the wrapping device 5 frees the sleeve 162 from the projecting hook portion 160 of the clutch bell crank 156 and allows the inner member 151 of the clutch to expand and to be driven approximately one-quarter of a revolution until the end 160 engages and catches the stop or sleeve 166. During this one-quarter rotation of the drive shaft 146, the tape folding arms 103 and 104 are operated by the cams 178 and 180. The folding arm 103 is first operated during this portion of the cycle and the upper end thereof is turned counterclockwise as viewed in Fig. 14 so as to wrap one end of the projecting ends of the tape around the upper portion or top of the tail pipe 101. During this operation one side of the flexible V-shaped strap member 117 engages the adjacent surface of the tail pipe and firmly presses the tape thereto. The upwardly swingable link 110 on the folding arm 103 permits the upper end of the flexible member 117 to follow around the contour of the tail pipe 101 and continually press the tape therearound. The tension produced by the spring 128 causes the outer end of the link 103 to follow the contour of the tail pipe.

The arm 103 is then retracted and the cam 180 now operates to move the other folding arm 104 so that it performs its operation and wraps the remaining free end of the length of tape over the top of the tail pipe and laps this free end over the previously folded opposite end of the tape. This phase of the operation is shown in Fig. 15. The arm 104 is then withdrawn and this cycle of the operation of the machine is then complete and the drive shaft 146 is stopped when the hook end 160 of the clutch lever 156 engages the sleeve 166. The applying and wrapping operation having been completed, the operator lifts the object, e. g. tail pipe 101, out of the wrapping device 5 and as he does so, the plunger plate 174 is released and the clutch is again tripped so that the projecting sleeve 166 is pulled over the end 160 and the inner element of the clutch and the drive shaft connected thereto are now driven the remainder of the revolution around to the point where the catch end 160 again engages the sleeve 162.

During this approximately three-quarter revolution of the shaft the second cycle of the machine operation is performed. The toothed portion of the gear wheel 216 now meshes with the pinion wheel 217 and drives this through one rotation so as to first pull the connecting rod 222 to its extreme right-hand position as viewed in Fig. 1 and to then its extreme left-hand position. This operation pivots the lever 224 first in a clockwise direction and then back in a counterclockwise direction. The bar 53 is thereby first shifted to the right-hand end of the machine as viewed in Fig. 1 so that its right end strikes against the stop screw 241. The compression spring 225 absorbs any shock as the bar hits the inner end of the screw 242. Thereafter the bar 53 is shifted to its left-hand position where it strikes the cylindrical block 247, the compression spring 226 absorbing any shock involved. By the time these movements have occurred, the mutilated portion of the gear wheel 216 comes around so as to disengage the pinion wheel 217.

The jaws 7 are open during their forward movement with the bar 53. After the forward movement (to the right as viewed in Fig. 1) of the bar 53 and the jaws 7 has been completed, the cam 176 operates to elevate the post 190 and the angle member 78 carried thereon. At this time the rocker arm 76 carried by the bar 53 is out at the far right end of the angle arms 78 as shown, for example, in Fig. 10. As the post 90 and its angle member 78 rise, they rotate the rocker shaft 75 in a direction so as to cause the toggle links 71 and 72 to close the jaw 45 against fixed jaw 49 with the projecting end of the tape clamped therebetween. Just after the clamping jaws 45 and 49 have clamped shut on the projecting end of the tape, the bar 53 is retracted to the left as viewed in Fig. 1. During this retracting movement the clamping jaws 7 withdraw a new length of tape over the top of the wrapping and applying device 5. As soon as the retracting movement has been completed for the jaws 7, the cam 182 operates to first close and then open the shears 8, thereby severing the withdrawn length of tape. The final movement of the cycle is accomplished when the cam 177 lifts the post 192 and the angle member 78 carried thereby so as to turn the toggle links 71 and 72 in the opposite direction and thereby open the jaws 7, leaving the tape T' in the position shown in Figs. 1 and 2 and ready to be applied to another article.

The V-shaped strap 117 may be omitted in certain instances. When so removed, other spring means should be connected to each of the links 110 and 111 so as to depress the free ends thereof and cause them to follow around the top of an elongated object inserted therebetween.

Since certain changes may be made in the embodiment of the invention described above and shown in the drawings and since other embodiments may be made without departing from the spirit and scope of the invention, the foregoing disclosure is intended to be interpreted as illustrative and not in a limiting sense.

What is claimed as new is:

1. Apparatus for applying and wrapping a length of tape to and around an object, comprising, V-shaped flexible strap means, a pair of opposed reciprocable folding members to each of which one of the free ends of said strap means is attached, and a pair of flexible flap members projecting toward each other over the top opening into said V-shaped strap means.

2. Apparatus for applying and wrapping a length of tape to and around an object, comprising, V-shaped flexible strap means, a pair of opposed folding arms to the free end of each of which one of the upper ends of said V-shaped strap means is attached, spring tension means attached to the apex of said V-shaped strap means for yieldably tensioning said apex away from the top opening in said V, and a pair of flexible flap members projecting toward each other over the top opennig in said V-shaped strap means.

3. Apparatus for applying and wrapping a length of tape to and around an elongated object, comprising, a pair of opposed tape folding arms pivotally mounted so that the upper ends thereof are swingable toward and away from each other, an upwardly swingable inwardly extending end link member pivotally mounted on the upper end of each of said arms, a V-shaped flexible strap disposed between said folding arms and having the upper ends thereof attached to the projecting ends of said link members, a rigid member lying in the apex of said V-shaped strap, spring means connected to the opposite ends of said rigid member so as to pull it downwardly and put tension on the opposite sides of said V-shaped strap, a pair of opposed inwardly projecting flap members supported above said V-shaped strap so as to apply a piece of tape lying over said flaps onto an elongated object lowered therebetween, and at least one pair of upstanding guide members located on the opposite sides of said V-shaped strap member and extending thereabove for guiding an elongated object between said flaps and into said V-shaped strap.

4. Apparatus for wrapping a length of tape around an elongated object, comprising, generally V-shaped flexible strap means for receiving the elongated object between the legs thereof, and a pair of opposed reciprocable tape folding members to each of which one of the free ends of said strap means is fixedly attached.

5. Apparatus for wrapping a length of tape to and around an elongated object, comprising, generally V-shaped flexible strap means for receiving the object, a pair of opposed tape folding arms having upwardly swingable inwardly extending link members to the free end of each of which one of the upper ends of said strap means is attached, and spring means attached to the bottom of the strap means for downwardly tensioning said strap means.

6. Apparatus for wrapping a length of tape to and around an elongated object, comprising, a member for receiving the object, a pair of opposed tape folding arms having upwardly swingable inwardly extending link members, means for supporting said arms whereby their opposing ends are reciprocable toward and away from each other, and spring means connected to each of said link members so as to yieldably press down the free end of each link member.

7. Apparatus for applying and wrapping a length of tape to and around an elongated object, comprising, a pair of opposed tape folding members adapted to close in from opposite sides of an object-receiving opening therebetween, and a pair of opposed flexible flap members the free ends of which project over said opening so as to support a free piece of tape lying over said flaps and apply it onto an elongated object as it is lowered between said folding members.

8. The apparatus called for in claim 1 having a depressible control member for controlling said folding members positioned in line with the opening between the sides of said V-shaped flexible strap means so as to be depressed and held down by an elongated object inserted into said apparatus and released when such object is removed therefrom.

(References on following page)

References Cited in the file of this patent

UNITED STATES PATENTS

| | | |
|---|---|---|
| 969,057 | Hayes | Aug. 30, 1910 |
| 1,347,134 | Tzbides | July 20, 1920 |
| 1,649,327 | Sheldon | Nov. 15, 1927 |
| 1,773,314 | Matson | Aug. 19, 1930 |
| 1,799,533 | Remnsnider | Apr. 7, 1931 |
| 1,861,144 | Schniedel | May 31, 1932 |
| 1,981,503 | Goeckeler | Nov. 20, 1934 |
| 2,005,846 | Parsons | June 25, 1935 |
| 2,645,071 | Mattson | July 14, 1953 |